United States Patent

Barca et al.

[11] Patent Number: 5,806,656
[45] Date of Patent: Sep. 15, 1998

[54] CONTAINER ROTATION ARRESTER

[75] Inventors: John G. Barca, Dublin; William D. Zuck, Canal Winchester, both of Ohio

[73] Assignee: Abbott Laboratories, Abbott Park, Ill.

[21] Appl. No.: 619,226

[22] Filed: Mar. 20, 1996

[51] Int. Cl.$^6$ ................................................ B65G 29/00
[52] U.S. Cl. ................................ 198/480.1; 198/481.1; 53/372.4
[58] Field of Search ............... 198/480.1, 481.1; 53/266.1, 272, 276, 277, 285, 287, 367, 372.4

[56] References Cited

U.S. PATENT DOCUMENTS

| | | | |
|---|---|---|---|
| 1,551,331 | 8/1925 | Risser | 198/480.1 |
| 2,324,312 | 7/1943 | Meyer et al. | 198/480.1 X |
| 5,261,207 | 11/1993 | Bedin | 198/481.1 X |
| 5,404,227 | 4/1995 | Sumita et al | 198/480.1 X |

FOREIGN PATENT DOCUMENTS

| | | | |
|---|---|---|---|
| 1171558 | 1/1959 | France | 198/481.1 |
| 364455 | 9/1962 | Switzerland | 198/481.1 |

*Primary Examiner*—Frank E. Werner
*Attorney, Agent, or Firm*—Brian R. Woodworth

[57] ABSTRACT

An apparatus is provided for arresting the rotation of a container while the container is conveyed so that a peripheral point on the container moves along a predetermined path. A conveyor includes an engagement structure for engaging a first portion of the periphery of the container to convey the container. An endless belt is arranged in a closed path adjacent the conveyor to contact a second portion of the periphery of the container and urge the container against the conveyor engagement structure.

6 Claims, 1 Drawing Sheet

CONTAINER ROTATION ARRESTER

TECHNICAL FIELD

This invention relates to an improved system for arresting the rotation of containers during processing. The invention is particularly suitable for use in preventing rotation of bottles conveyed in a rotating star wheel.

BACKGROUND OF THE INVENTION

Containers are typically processed while being moved along a processing path by one or more conveying mechanisms. Such a process can include filling the container, capping the container, labelling the container, etc.

In some container processing steps, it is desirable or necessary to prevent rotation of the container. For example, when applying a threaded cap to a container, the container is typically engaged to limit its rotation while the cap is rotated and threadingly engaged with the container by means of an automatic capping machine.

More specifically, containers such as bottles are typically conveyed by means of a star wheel along a circular arc path below the coincident path of the automatic capping machine capping head. A conventional method for preventing rotation of the containers relies on the use of high spring force brake pads which engage the bottles. The pads apply a force to the bottles which is directed radially inwardly toward the center of the star wheel. The use of a rigid, high spring force brake pad permits the holding force (i.e., the inwardly directed force) to vary as one or two bottles are conveyed past the brake pad and as the bottles move from one brake pad to an adjacent brake pad.

Unless the brake pad force is relatively high, the bottles can slip and undergo rotation. However, a high brake pad force can be problematic when the bottles are constructed of a deformable material such as plastic due to the fact that the high force can cause an undesirable deformation and/or scratching of the bottles as they are moved by the star wheel. Typically, star wheels incorporate friction liners, and any container rotation causes wear of the liners. Excessive wear can occur over a period of time, such as over a normal eight-hour production run—especially at high operating line speeds and high bottle processing rates. The wearing of the star wheel liners can lead to misalignment between the bottle and the cap being threaded to the bottle by means of the automatic capping machine. Such misalignment can lead to the breaking of tamper bands associated with some caps. In some cases, misalignment can result in a lack of proper threaded engagement between the cap and threaded bottle, i.e., a crooked or loose cap.

Further, the rotation of a bottle during the final torquing operation can lead to the inconsistent application of a final torque to the cap. Thus, the amount of torque required to remove a cap from a bottle undesirably varies from bottle to bottle.

The above-discussed problems resulting from bottle rotation during processing are especially undesirable when applying a plastic cap to a plastic bottle. The undesired rotation of the plastic bottle against the brake pads and the star wheel liner can cause scraping, scratching, or marking of the exterior surface of the plastic bottle. In addition, a misalignment between the plastic bottle and the plastic cap during the capping process can result in the formation of plastic particulate which can become trapped between the bottle and the cap. Upon removal of the cap, the plastic particulate may find its way into the bottle.

It would be desirable to provide an improved system for moving or otherwise processing containers along a conveying path which would eliminate, or at least substantially minimize, the rotation of the container, at least along selected portions of the processing path.

Further, such an improved system should preferably eliminate or minimize damage to the exterior surface of the container.

Also, it would be beneficial if such an improved system could be readily adapted for use with a rotating star wheel in a way that eliminates or substantially reduces the wear of the star wheel liners. This would eliminate or substantially reduce the possibility of stripping the cap thread or container thread during the cap application process owing to misalignment.

Finally, it would be desirable if such an improved system could provide a substantially constant restraining force on containers during capping operations so as to facilitate imposition of a substantially constant, final capping torque. This would result in an improved package, comprising the container and threadingly engaged cap, with a predetermined removal torque characteristic which would be substantially uniform from package to package, thereby enhancing the primary seal of the package.

The present invention provides an improved container rotation arrester system which can accommodate designs having the above-discussed benefits and features.

SUMMARY OF THE INVENTION

According to the present invention, an improved system is provided for reducing or eliminating rotation of containers during processing. The improved system is particularly suitable for use in capping operations wherein a threaded cap is applied with an automatic capping machine to a threaded container conveyed by a rotating star wheel.

The improved system of the present invention substantially reduces the rate of wear of liners in such a star wheel, and thus reduces the possibility of misalignment between the threaded cap and threaded container.

The improved system also reduces or eliminates damage to the exterior surface of the container.

Further, the improved system facilitates the application of a substantially constant final capping torque by a capping system.

Specifically, the system includes an apparatus for arresting the rotation of a container while the container is conveyed so that a peripheral point on the container moves along a predetermined path. In a preferred embodiment, the predetermined path is an arcuate path such as a circular arc.

The apparatus includes a conveyor which has a movable engagement structure adjacent the predetermined path for engaging a portion of the periphery of the container and for conveying the container along the predetermined path.

An endless belt is arranged in a closed path adjacent the container. A portion of the closed path of the belt is coincident with the predetermined path of the peripheral point on the container, and the belt contacts the peripheral point on the container to urge the container against the conveyor engagement structure. The belt travels around the closed path at a linear speed which is substantially equal to the speed of the container peripheral point along the predetermined path.

The portion of the belt contacting the container thus travels with the container to prevent rotation of the container while preventing scratching or marking of the container. The belt applies a generally uniform, constant holding force against the container on the conveyor.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification.

DESCRIPTION OF THE PREFERRED EMBODIMENT

Figure 1:
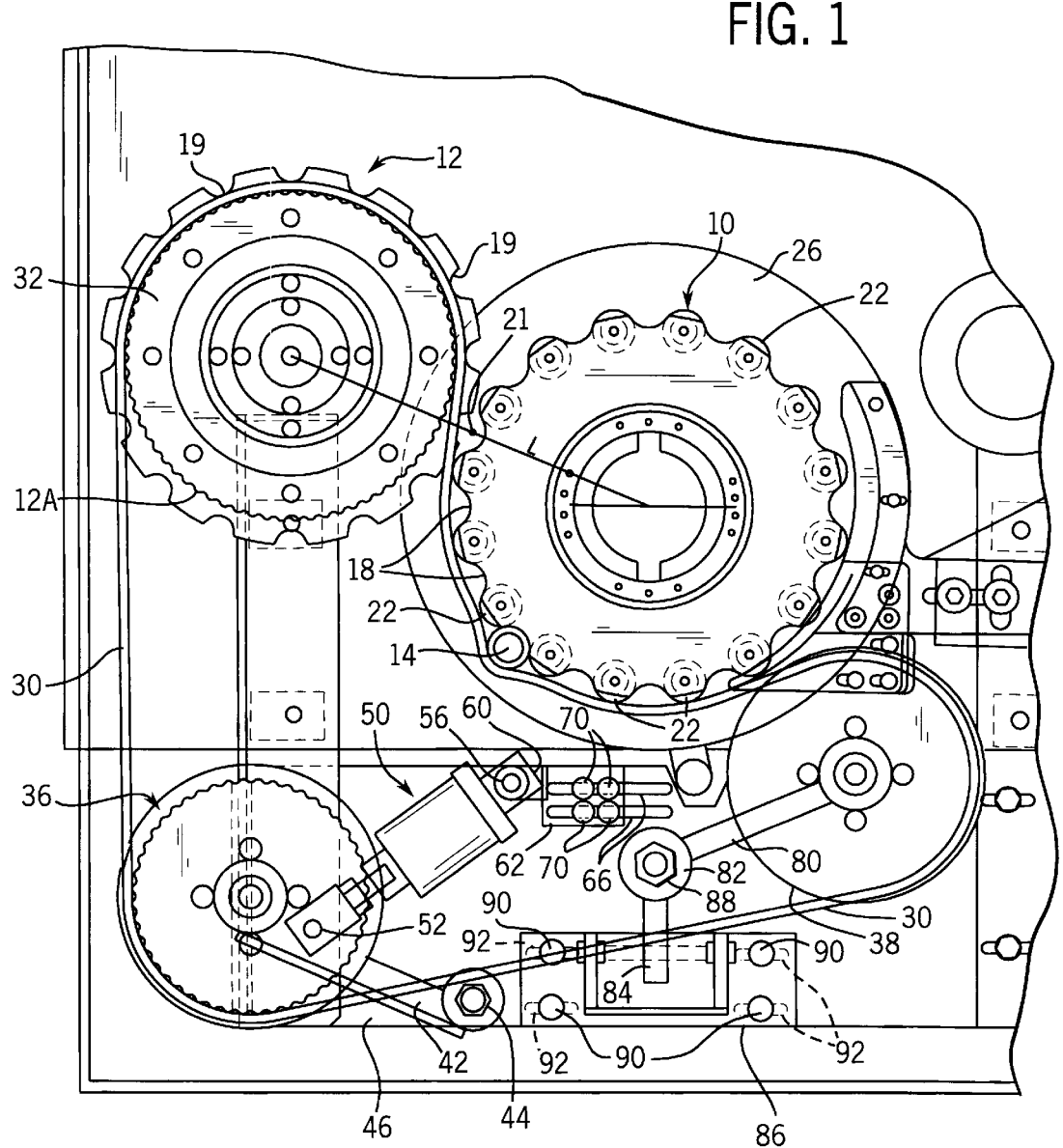
FIG. 1 is a simplified, fragmentary, plan view of a portion of a container processing system which incorporates the container rotation arrester apparatus of the present invention.

While this invention is susceptible of embodiment in many different forms, this specification and the accompanying drawing disclose only one specific form as an example of the invention. The invention is not intended to be limited to the embodiment so described. The scope of the invention is pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, and sold in an orientation other than the position described.

The figure illustrating the apparatus shows some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

The apparatus of this invention is used with certain conventional components the details of which, although not fully illustrated or described, will be apparent to those having skill in the art and an understanding of the necessary functions of such components.

As described herein, the present invention will be described in connection with a bottle capping system. For example, the present application can be used in connection with the invention described in a U.S. Pat. No. 5,687,552 issued Nov. 18, 1997 entitled, "Adapter System for a Capping Machine for Applying at Least One Predetermined Axial Load," filed by John Barca, one of the inventors herein, on the same date that this application was filed. That application is incorporated herein by reference. However, it will be appreciated that the present invention can be used in connection with forms of containers other than bottles. In addition, it will be appreciated that the present invention can be used in applications other than bottle capping systems in which it is desirable to prevent rotation of a member being conveyed by a conveyor system such as a star wheel. For example, the apparatus of the present invention can be used in connection with manufacturing, filling, and labelling equipment.

A preferred embodiment of the apparatus of the present invention is illustrated in FIG. 1 as incorporated in a bottle capping system. The bottle capping system includes a bottle conveyor comprising a first star wheel or center dial 10 and a second star wheel or exit wheel 12 which are adapted to receive and convey a plurality of bottle or containers 14 seriatim. Only one container 14 is shown in FIG. 1 for ease of illustration. In the preferred embodiment of the present invention, first and second star wheels 10, 12 are substantially the same size and are in tangential contact with one another. It will be appreciated that the second star wheel 12 rotates in a counterclockwise direction as viewed in FIG. 1, opposite to the clockwise direction of rotation of the first star wheel 10.

The first star wheel 10 defines a plurality of engagement structures or receiving pockets 18. Each pocket 18 receives a container 14 and conveys the container 14 along a circular arc path. Each pocket 18 may include a conventional liner, and adjacent pockets 18 may be separated by, and in part defined by, belt stops 22. Belt stops 22 preferably have a rounded exterior surface in order to facilitate the entry and exit of containers 14 into pockets 18 of first star wheel 10. The function of belt stops 22 will be described in greater detail below. In the preferred embodiment of the present invention, the bottom of each container 14 is supported by a plate 26. In the preferred embodiment of the present invention, plate 26 rotates at substantially the same rate as first star wheel 10, thereby preventing scratching or scuffing of the bottom surface of containers 14 as they are conveyed by first star wheel 10. In alternative embodiments of the present invention, plate 26 is stationary or is omitted.

Containers 14 can be fed into the first star wheel pockets 18 by a conventional apparatus, the details of which form no part of the present invention. Containers 14 exit from the first star wheel 10 at exit point 21 upon engagement with pockets 19 defined by the second star wheel 12. In the embodiment of the present invention depicted in FIG. 1 in which first and second star wheels 10, 12 are in tangential contact, exit point 21 can be identified by drawing a line L between the respective axes of rotation of first and second star wheels 10, 12. Exit point 21 is the point at which the resulting line L crosses the periphery of first and second star wheels 10, 12. The containers 18 are conveyed or removed from the system by suitable conventional means, the details of which form no part of the present invention.

The first star wheel 10 and second star wheel 12 may typically be provided as part of a conventional rotary style manufacturing, filling, capping, or labeling machine with a conventional star wheel drive system (not illustrated). When the apparatus of the present invention is employed as a part of a capping machine, the capping machine also includes a capping column or head (not illustrated) which moves downwardly relative to a container 14 held in the first star wheel 10 and applies a threaded cap to a thread on the container 14 as the capping head and container 14 move in registry in a circular arc path.

The first star wheel 10 may be characterized as defining a conveyor for conveying a container or a plurality of containers 14 along a path. If the container 14 does not rotate about its vertical axis in the pocket 18 as the first star wheel 10 rotates, a point on the exterior surface of the container 14 will move in a circular arc path about the axis of rotation of first star wheel 10. In such a case, the container 14 may be described as being conveyed so that a peripheral point on the container moves along a predetermined path defined by the axis of rotation of first star wheel 10.

In order to insure that the container 14 does not rotate within the pocket 18, an endless belt 30 is arranged in a closed path adjacent the star wheel conveyor system to contact an outermost peripheral point on the container 14 and urge the container 14 against the star wheel 10. Belt 30 is wrapped around a portion of the star wheel 10 and is supported thereon by belt stops 22. Belt 30 in the preferred embodiment of the present invention is constructed of a resilient material such as rubber and includes a high-friction surface adapted to engage frictionally the periphery of one or more containers 14. Belt 30 can be constructed of a variety of materials depending upon the environment in which the apparatus of the present is used. For example, when the apparatus of the present invention is intended to be used in a milk product bottling or capping environment, belt 30 is preferably constructed of a rubber material and has a high-friction inner surface which enables belt 30 to engage and retain containers 14 in pockets 18. Belts 30 of other materials can be used in dry applications of the present invention. As depicted in FIG. 1, belt 30 engages the peripheries of containers 14 retained in pockets 18 of first star wheel 10. In the event that a pocket 18 does not contain a container 14, belt 30 engages the belt stops 22 on either side of pocket 18. Belt stops 22 inhibit the radially inward dislocation of belt 30 with respect to first star wheel 10 and thus prevent belt 30 from developing slack in areas proximate pockets 18 that do not contain containers 14.

In the embodiment of the present invention depicted in FIG. 1, belt 30 also is wrapped about a portion of second star wheel 12. In this embodiment, second star wheel 12 preferably includes an extension 33 which supports belt 30 while the scalloped portion of second star wheel 12 is positively driven. In the preferred embodiment of the present invention, extension 33 is an idler wheel 12A. This configuration of second star wheel 12 accounts for the positioning of belt 30 on second star wheel 12 relative to the positioning of belt 30 on first star wheel 10. That is, belt 30 engages containers 14 at a radially outermost position when belt 30 is positioned about first star wheel 10, while belt 30 engages second star wheel 12 at a radially innermost position of pockets 19. It will be appreciated that the radial position of belt 30 on second star wheel 12 can be varied without departing from the scope of the present invention.

Containers 14 retained in pockets 18 begin to exit first star wheel 10 at an exit point 21 due to the cooperative relationship of first and second star wheels 10, 12. For this reason, all actions to be taken with respect to containers 14 being conveyed by first star wheel 10 must be completed prior to the time at which containers 14 reach exit point 21. In the preferred embodiment of the present invention, belt 30, first star wheel 10, and second star wheel 12 are configured such that belt 30 is lifted from the exterior surface of a container 14 substantially at the same time that container 14 reaches exit point 21. In this way, belt 30 prevents rotation of containers 14 in pockets 18 until a time at which all actions with respect to containers 14 have been completed, thereby ensuring that no rotation of containers 14 relative to pockets 18 occurs during the latter stages of conveyance of containers 14 by first star wheel 10.

The point at which belt 30 first comes into contact with containers 14 or belt stops 22 can be varied dependent upon the application of the present invention. It is preferable that the apparatus of the present invention be configured such that belt 30 frictionally engages containers 14 and thus prevents rotation of containers 14 at all times at which relative rotation between containers 14 and first star wheel 10 is not desired. Thus, the apparatus of the present invention can be configured such that belt 30 engages containers 14 carried by first star wheel 10 earlier than the five o'clock position depicted in FIG. 1.

In the embodiment of the present invention depicted in FIG. 1, belt 30 is wrapped approximately 180° around the second star wheel 12. However, it will be appreciated that belt 30 can be wrapped about a smaller or greater portion of star wheel 12 dependent upon the application of the present invention. For example, additional idler wheels can be positioned such that belt 30 wraps about a smaller or larger portion of second star wheel 12.

Belt 30 is wrapped about an idler wheel portion of the second star wheel 12. As above-discussed, in the embodiment of the present invention depicted in FIG. 1, idler wheel portion 12A preferably rotates freely relative to the remainder of second star wheel 12 due to the radial positioning of belt 30 relative to first and second star wheels 10, 12.

The preferred embodiment of the apparatus further includes a first idler wheel 36 and a second idler wheel 38 about which the belt 30 is also wrapped. The first idler wheel 36 is preferably mounted on an arm 42 which is pivotally mounted with a bolt 44 on a platform 46. The arm 42 can be pivoted to a desired angle to apply a desired tension to the belt 30. To this end, the arm 42 is connected to a hydraulic or pneumatic piston-cylinder actuator 50 of known construction. One end of the actuator 50 is pivotally mounted with a pin 52 to the arm 42. The other end of the actuator 50 is mounted with a pin 56 to a bracket 60 extending from a slidable adjustment plate 62 which is supported on the platform 46.

The platform 46 defines a pair of spaced-apart, parallel channels 66 for receiving retainers 70. The retainers 70 project through the adjustment plate 62 with the heads of retainers 70 engaging the top surface of the adjustment plate 62. When the retainers 70 are loosened, the adjustment plate 62 can be moved (to the left or to the right as viewed in FIG. 1) to effect pivoting of the actuator 50 counterclockwise or clockwise, respectively, about the pin 52 on the pivot arm 42. The actuator 50 can be operated to extend or retract a desired amount so as to pivot the arm 42 and apply appropriate tension to the belt 30 through the first idler wheel 36.

The second idler wheel 38 is mounted for rotation on an arm 80 extending from an adjustment bushing 82 rotatably mounted to an arm 84 extending from a plate 86 which, is carried on the platform 46. A bolt 88 can be secured with a nut (not visible) to tighten the bushing 82 relative to the arm 84 so that the arm 80 is at a desired angle.

The adjustment plate 86 is held on the platform 46 by means of four screws 90 which are threadingly engaged below the platform 46 with nuts (not visible). The platform 46 defines four elongate apertures 92. Each elongate aperture 92 receives one of the screws 90 and accommodates lateral adjustment of the adjustment plate 86, and hence, adjustment of the position of the second idler wheel 38.

When the first star wheel 10 rotates in the clockwise direction as viewed in FIG. 1 to convey the container or containers 14, the belt 30 is driven in a closed loop in the counterclockwise direction as viewed in FIG. 1 owing to the engagement of the belt 30 with the containers 14 and/or owing to engagement of the belt 30 with belt stops 22 adjacent those pockets 18 that do not contain a container 14. Thus, the belt 30 is self-compensating and self-tensioning regardless of how many containers 14 may be carried in the first star wheel 10 between the idler wheel 38 and second star wheel 12 so long as an appropriate tension force is maintained on the belt 30 by the actuator 50.

In operation, the belt 30 preferably contacts each container 14 prior to the filling/capping machine engaging the container. As above-discussed, the belt 30 preferably maintains contact with the container 14 until after the filling/capping machine has been disengaged from the container 14, i.e., until containers 14 reach exit point 21.

The apparatus of the present invention is configured such the belt 30 travels at the same speed as the outermost periphery of each container 14., thereby preventing relative motion between belt 30 and the outermost periphery of each container 14. Belt 30 can be positively driven by a belt drive mechanism of known construction or passively driven by rotation of first star wheel 10. In the preferred embodiment of the present invention, belt 30 is passively driven by first star wheel 10 through containers 14 and/or belt stops 22. The apparatus thus eliminates or substantially minimizes damage to the container 14 exterior surface (scratches, scrapes, etc.) caused by the brake pads of the prior art systems. Each container 14 is subjected to a substantially uniform and constant clamping force which prevents rotation of the container within the first star wheel 10, thus eliminating or substantially minimizing damage to the container 14 exterior surface caused by rotation thereof relative to pocket 18. Wear of the star wheel liners within pockets 18 thus is substantially reduced and the capping process can be effected with little or no misalignment. Also, the capping process is effected with a final torque that is more uniform from container to container.

It will be readily apparent from the foregoing detailed description of the invention and from the illustrations thereof that numerous variations and modifications may be effected without departing from the true spirit and scope of the novel concepts or principles of this invention.

What is claimed is:

1. An apparatus for arresting the rotation of a container while the container is conveyed, said apparatus comprising:
    a conveyor comprising a first star wheel having a first axis of rotation and a second star wheel having a second axis of rotation, said first star wheel including an engagement structure for engaging a first portion of a periphery of a container to convey said container along a predetermined path; and
    a means for engaging a second portion of a periphery of a container conveyed by said conveyor and for preventing relative rotation between the container and said engagement structure of said conveyor, said means for engaging and preventing rotation comprising a continuous belt, said continuous belt having an engagement surface constructed to engage said second portion of a periphery of a container conveyed by said conveyor, said continuous belt arranged in a closed path, said closed path including an engagement portion, said engagement surface of said continuous belt contacting a container conveyed by said container along said engagement portion of said closed path, said engagement portion of said closed path of said continuous belt comprising an exit point at which said engagement surface of said continuous belt disengages said second portion of a periphery of a container conveyed by said conveyor said exit point of said engagement portion of said closed path of said continuous belt lying substantially along a line drawn between said first and second axes of rotation.

2. An apparatus in accordance with claim 1, wherein said second star wheel comprises a first portion and an extension extending from said first portion, and wherein said continuous belt engages said extension.

3. An apparatus in accordance with claim 2, wherein said extension comprises an idler wheel and wherein said continuous belt engages said idler wheel.

4. An apparatus in accordance with claim 1, wherein said means for engaging and preventing rotation further comprises a tensioning means for applying a tension force to said continuous belt.

5. An apparatus for capping a container, said apparatus comprising:
    a conveyor comprising a first star wheel having a first axis of rotation and a second star wheel having a second axis of rotation, said first star wheel having an engagement structure for engaging a first portion of a periphery of a container to convey said container along a predetermined path; and
    a means for engaging a second portion of a periphery of a container conveyed by said conveyor and for preventing relative rotation between the container and said engagement structure of said conveyor, said means for engaging and preventing rotation comprising a continuous belt, said continuous belt having a engagement surface constructed to engage said second portion of a periphery of a container conveyed by said conveyor, said continuous belt arranged in a closed path, said closed path including an engagement portion, said engagement surface of said continuous belt contacting a container conveyed by said container along said engagement portion of said closed path, said engagement portion of said closed path of said continuous belt comprising an exit point at which said engagement surface of said continuous belt disengages said second portion of a periphery of a container conveyed by said conveyor, said exit point of said engagement portion of said closed path of said continuous belt lying substantially along a line drawn between said first and second axes of rotation.

6. An apparatus in accordance with claim 5, wherein said means for engaging and preventing rotation further comprises a tensioning means for applying a tension force to said continuous belt.

* * * * *